UNITED STATES PATENT OFFICE.

FRANK E. HALL, OF WOLLASTON, MASSACHUSETTS, ASSIGNOR TO CHARLES L. IRESON, OF BOSTON, MASSACHUSETTS.

STEAM-PACKING COMPOSITION.

SPECIFICATION forming part of Letters Patent No. 597,357, dated January 11, 1898.

Application filed February 18, 1897. Serial No. 624,029. (No specimens.)

*To all whom it may concern:*

Be it known that I, FRANK E. HALL, of Wollaston, in the county of Norfolk and State of Massachusetts, has invented a new and useful Improvement in Steam-Packing Compositions, of which the following is a specification.

My invention relates to a compound that can be vulcanized or used without being vulcanized, but will vulcanize at about the temperature of other compounds used for steam-packing or rubber springs and is adapted to use as a packing for steam, water, acid, or air joints. When used unvulcanized in steam-joints, it will become vulcanized in the joint, being very tough, and will stand a great amount of heat and make a perfectly tight joint, although the joint can be taken apart and not have the packing adhere to or vulcanize to the joint, which is the great objection to other rubber packings unless they are coated with plumbago or chalk.

In making my packing I use the following materials and about these proportions: sixteen pounds of india-rubber, sixteen pounds of paris-white, four pounds of zinc, one pound of sulfur, five pounds of ultramarine-blue, and thirty pounds powdered asbestos. These materials are mixed or ground together with the ordinary rubber machinery and put into various forms and either vulcanized or used unvulcanized, as the case requires.

I find that when ultramarine-blue is used in a rubber compound the compound will not become hardened by age, and in a steam-packing will greatly improve the packing by preventing it from adhering to the joint and obviates the trouble of using plumbago or chalk, as is necessary with other rubber packings.

I find by using a large quantity of powdered asbestos that my packing will resist much more heat and prevent the rubber from being burned out of the compound.

I find the various kinds of rubber will take up in mixing different quantities of ultramarine-blue and asbestos. I therefore do not limit myself to the exact proportions specified.

I am aware that india-rubber, sulfur, zinc, paris-white, litharge, and asbestos have been used in steam-packing; but in my invention the use of the ultramarine-blue and asbestos combined with the various other materials which make up the ordinary rubber compounds produce a steam-packing which is much more durable, resists more heat, and is less trouble to use than has heretofore been made.

I claim as my invention—

1. A composition of ultramarine-blue and asbestos with an ordinary rubber compound.

2. A composition of ultramarine-blue, asbestos, india-rubber, paris-white, zinc, and sulfur, substantially as described and for the purposes as set forth.

In testimony whereof I have signed my name to this specification, in the presence of two subscribing witnesses, on this 8th day of April, A. D. 1896.

FRANK E. HALL.

Witnesses:
GEO. A. HOLMES,
STANLEY F. HALL.